United States Patent
Paterson et al.

(10) Patent No.: US 10,027,684 B1
(45) Date of Patent: Jul. 17, 2018

(54) METHOD AND SYSTEM FOR USER CREDENTIAL SECURITY

(71) Applicant: United Services Automobile Association (USAA), San Antonio, TX (US)

(72) Inventors: Kevin G. Paterson, San Antonio, TX (US); Noah A. McConnell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 110 days.

(21) Appl. No.: 15/099,326

(22) Filed: Apr. 14, 2016

Related U.S. Application Data (60) Provisional application No. 62/151,229, filed on Apr. 22, 2015.

(51) Int. Cl.
 G06F 7/04 (2006.01)
 H04L 29/06 (2006.01)

(52) U.S. Cl.
 CPC .......... *H04L 63/126* (2013.01); *H04L 63/102* (2013.01)

(58) Field of Classification Search
 None
 See application file for complete search history.

(56) References Cited

U.S. PATENT DOCUMENTS

| | | | |
|---|---|---|---|
| 5,956,404 A | 9/1999 | Schneier et al. | |
| 6,578,760 B1 | 6/2003 | Otto | |
| 7,225,253 B2 | 5/2007 | Ofir et al. | |
| 7,698,571 B2 | 4/2010 | Harada et al. | |
| 7,853,992 B2 | 12/2010 | Garg et al. | |
| 8,856,899 B1 | 10/2014 | Morlen et al. | |
| 2003/0028484 A1 | 2/2003 | Boylan et al. | |
| 2003/0084301 A1 | 5/2003 | Krawetz et al. | |
| 2004/0177281 A1 | 9/2004 | Balaz et al. | |
| 2006/0294392 A1 | 12/2006 | Veprek et al. | |
| 2008/0095331 A1 | 4/2008 | Wlasiuk | |
| 2008/0222707 A1 | 9/2008 | Pathuri et al. | |

(Continued)

OTHER PUBLICATIONS

Bank of America, "SafePass™: Online Banking Security Enhancements," Retrieved from the internet <http://www.bankofamerica.com/privacy/index.cfm?template=learn_about_safepass>. © 2008 Bank of America Corporation.

(Continued)

*Primary Examiner* — Brandon S Hoffman
(74) *Attorney, Agent, or Firm* — Fish & Richardson P.C.

(57) ABSTRACT

Methods, systems, and apparatus, including computer programs encoded on a computer storage medium, for receiving first user input by a primary device from a primary input device, where the user input is provided by a user to the primary input device that is coupled to a primary device. Receiving second user input provided by the user to a secondary input device that is in communication with the primary device. Determining a user credential based on the first user input and the second user input, where at least one or the first input and the second input includes at least a portion of the user credential. Receiving an indication that the user is authentic based on the user credential, and, in response, enabling the user to further interact with the primary device.

20 Claims, 7 Drawing Sheets

(56) References Cited

U.S. PATENT DOCUMENTS

| | | | |
|---|---|---|---|
| 2009/0217035 A1 | 8/2009 | Khan et al. | |
| 2014/0089196 A1* | 3/2014 | Paya | G06F 21/31 |
| | | | 705/44 |
| 2014/0337528 A1* | 11/2014 | Barton | H04L 41/00 |
| | | | 709/225 |

OTHER PUBLICATIONS

Manzoor, Umar et al., "Ensuring Data Security & Consistency in FTIMA—A Fault Tolerant Infrastructure for Mobile Agents", Proceedings of World Academy of Science, Engineering and Technology vol. 21 May 2007 ISSN 1307-6884. © 2007 waset.org.

* cited by examiner

METHOD AND SYSTEM FOR USER CREDENTIAL SECURITY

CROSS-REFERENCE TO RELATED APPLICATION

This application claims the benefit of the filing date of U.S. Provisional Application No. 62/151,229, filed on Apr. 22, 2015. The contents of U.S. Application No. 62/151,229 is incorporated herein by reference in their entirety.

BACKGROUND

People often enter authentication credentials in public locations while in view of others who may intentionally or unintentionally observe one's credentials. Traditional techniques for maintaining the privacy of such information may, in some circumstances, help prevent the compromise of authentication credentials, but such techniques are becoming increasingly ineffective.

SUMMARY

This specification relates to methods and systems for maintaining the security of electronic authentication credentials. More specifically, the specification relates to methods and systems for maintaining the security of personal identification number (PIN) in public settings.

Implementations of the present disclosure generally enable a user to enter one or more authentication credentials including at least one false character using a first input device. Input from a second input device can be used to determine the true authentication credential. More particularly, implementations of the present disclosure are directed to receiving a first user input entered using a first input device, where the first user input includes one or more false characters. Receiving a second user input from a second input device. The second input is used to determine which characters of the first input are false characters, and to determine the user's true authentication credential based on the first and second input. The second input can be concurrent in time with the first input, and can include visual, tactile, or audible gestures. Implementations of the present disclosure provide the user with a representation of an input device. The user enters their authentication credential on the input device based on the representation, and a computing device uses a mapping between characters on the representation to characters on the input device to map the received input to the user's true credential. Implementations of the present disclosure enable a user to view a private mapping of an input device, and to enter an authentication credential using discrete gestures relative to the private mapping.

In general, innovative aspects of the subject matter described in this specification can be embodied in methods that include actions of receiving first user input by a primary device from a primary input device, where the user input is provided by a user to the primary input device that is coupled to a primary device. Receiving second user input provided by the user to a secondary input device that is in communication with the primary device. Determining a user credential based on the first user input and the second user input, where at least one or the first input and the second input includes at least a portion of the user credential. Receiving an indication that the user is authentic based on the user credential, and, in response, enabling the user to further interact with the primary device. Other implementations of this aspect include corresponding systems, apparatus, and computer programs, configured to perform the actions of the methods, encoded on computer storage devices.

These and other implementations can each optionally include one or more of the following features. The secondary input device can be a component of the primary device. The secondary input device can be a computing device of the user and is in communication with the primary device. The first user input can include a plurality of characters including one or more true characters and at least one false character, the second user input indicating the at least one false character. The primary input device can be a keypad of the primary device, and the first user input can include user input to the keypad of the primary device.

The second user input can be provided based on visual gestures of the user, where the visual gestures are detected by the secondary input device. The second user input can be provided based on audible gestures of the user, where the audible gestures are detected by the secondary input device. The second user input can be provided based on tactile gestures of the user, where the tactile gestures are detected by the secondary input device. The primary device and the secondary input device can be in communication through a short-range network or near field communications (NFC).

In general, additional innovative aspects of the subject matter described in this specification can be embodied in methods that include actions of establishing communication with a secondary device by a primary device. Providing an input mapping to the secondary device, where the input mapping associates potential user inputs. Receiving first user input provided by the user to at least one of the primary device and the secondary device based on the input mapping. Determining a user credential based on the first user input. Receiving an indication that the user is authentic based on the user credential, and, in response, enabling the user to further interact with the primary device. Other implementations of this aspect include corresponding systems, apparatus, and computer programs, configured to perform the actions of the methods, encoded on computer storage devices.

These and other implementations can each optionally include one or more of the following features. The input mapping can associate false user input to actual user input. The first user input can be provided to the primary device. The first user input can be provided to the secondary device. The first user input can be provided based on visual gestures of the user, where the visual gestures are detected by the secondary device. The first user input can be provided based on tactile gestures of the user, where the tactile gestures are detected by the secondary device.

Establishing communication with a secondary device can include establishing communications between the primary device and the secondary device through a short-range network or NFC. The input mapping can relate a first set of input controls of an input device to a representation of a second set of input controls displayed on the secondary device Particular implementations of the subject matter described in this specification can be implemented so as to realize one or more of the following advantages. Implementations may prevent identity theft and fraud resulting from stolen user authentication credentials, such as PINs. Implementations may improve present technologies for protecting consumer information in public settings. Some implementations may provide greater accessibility to computing devices for users with disabilities.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure generally enable a user to enter an authentication credential including at least one false character using a first input device. Input from a second input device can be used to determine the user's true authentication credential. More particularly, implementations of the present disclosure are directed to receiving a first user input entered on a first input device, where the first user input includes one or more false characters, and receiving a second user input from a second input device. The second input is used to determine which characters of the first input are false characters, and to determine the user's true authentication credential based on the first and second input. In some examples, the second input can be concurrent in time with the first input, and can include visual, tactile, or audible gestures. In some implementations, a representation of an input device is presented to the user. In some examples, the user enters their authentication credential on the input device based on the representation, and a computing device uses a mapping between characters on the representation to characters on the input device to map the received input to the user's true credential. Implementations of the present disclosure also enable a user to view a private mapping of an input device, and to enter an authentication credential using discrete gestures relative to the private mapping.

Technologies continue to arise that enable dishonest people to steal personal information from users in ever more discrete manners; techniques ranging from simply using a smartphone to record a customer entering a personal identification number (PIN) at an automated teller machine (ATM), or credentials (e.g., username, password, social security number, birthdate) into a computing device, to complex algorithms for deciphering keystrokes based on a person's shadow. Often, one may not know that they have been the victim of such theft until long after the theft occurred. Implementations of the present disclosure provide technical solutions to this and other problems related to authentication credential security.

Implementations of the present disclosure will be discussed in further detail with reference to an example context. The example context includes use of an ATM. It is appreciated, however, that implementations of the present disclosure can be realized in other appropriate contexts, for example, device unlocking (e.g., smartphone, tablet, laptop and desktop computers), application unlocking (e.g., electronic wallets, electronic passports, online shopping), vehicle entry, gate code entry; or with other appropriate devices, for example, safes, cyberlocks, electronic kiosks, point-of-sale devices televisions, cable boxes, internet TV devices (e.g., Roku®).

Furthermore, the terms "personal identification number" and "PIN" are not limited to traditional multi-digit numerical codes (e.g., 4-6 digit numerical codes), but refer to a user credentials more generally such as, for example, usernames, passwords, access codes, confirmation codes (e.g., an airline ticket confirmation code), tracking codes (e.g., a shipment tracking code), of any appropriate length and including alphanumeric characters, symbols, gestures (e.g., visual, audible, or tactile gestures), or a combination of the three.

Figure 1A:
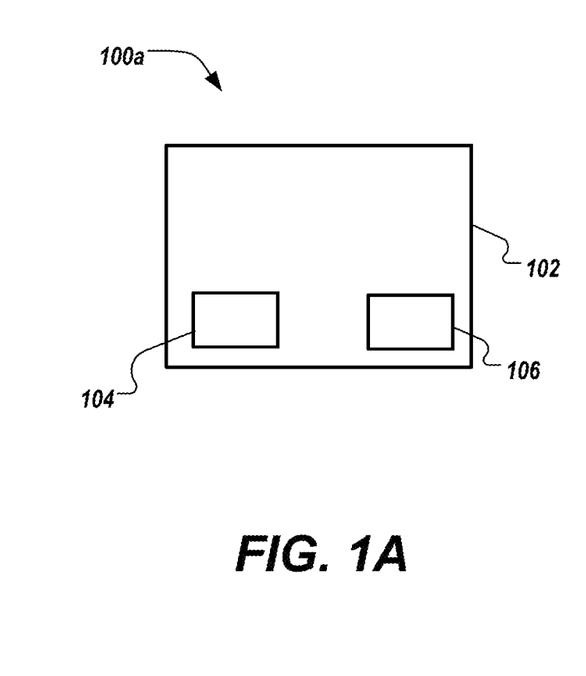
FIGS. 1A and 1B depict example systems in accordance with implementations of the present disclosure.
Figure 1B:
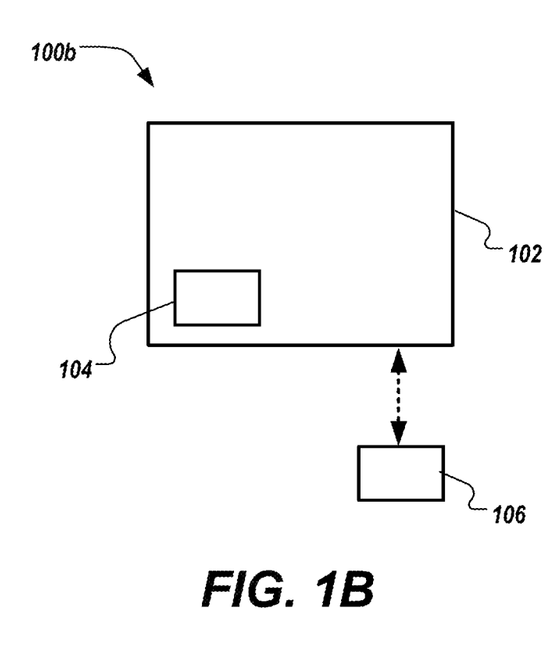

FIGS. 1A and 1B depict example systems 100a, 100b that can execute implementations of the present disclosure. Referring to FIG. 1A, the example system 100a includes a primary computing device 102 in communication with a primary input device 104 and a secondary input device 106. The primary computing device 102 can be implemented using one or more computing devices configured to interface with primary and secondary input devices 104, 106. The primary computing device can be, for example, an ATM kiosk. In other contexts, the primary computing device 102 can be, for example, a mobile device (e.g., a smartphone, tablet computer), a point-of-sale device (e.g., a credit/debit card reader), a television, a vehicle entry system, a gate or building entry system, etc. The primary computing device 102 can have internal or external storage components storing data and programs such as an operating system and one or more application programs. The one or more application programs can be implemented as instructions that are stored in the storage components and that, when executed, cause the one or more computing devices to provide the features of the primary computing device 102. Furthermore, the primary computing device 102 can include one or more processors for executing instructions stored in storage and/or received from one or more other electronic devices, for example a network. In addition, these computing devices also typically can include network interfaces for sending and receiving data over one or more networks, such as a local area network (LAN), wide area network (WAN), the Internet, a cellular network, a satellite network, one or more wireless access points, or a combination thereof connecting any number of mobile clients, fixed clients, and servers.

The primary and secondary input devices 104, 106 can be a keyboard, keypad, touchpad, touchscreen, camera, microphone, or other appropriate input device. Generally, the primary input device 104 is an input device configured to receive a PIN, such as a keyboard, key pad, touchpad, or touch screen. The secondary device 106 is, generally, an input device configured to receive a security input (e.g., a gesture), such as a camera, microphone, touchpad, or touchscreen. In addition, the primary and secondary input devices 104, 106 are in electronic communication with the primary computing device 102 (e.g., by a wired or wireless connection), and can be integral components of the primary computing device 102.

In some implementations, the primary computing device 102 concurrently receives a first input from the primary input device 104 (e.g., a PIN), and a second input from secondary input device 106. The first input can include one or more false characters or digits, and the second input can include one or more indications of which digits of the first input are false. The primary computing device 102 uses the second input to identify false digits in the first input to determine a user's true PIN, for example. The primary computing device 102 can use the true PIN to authenticate the user, and enable further interactions between the user and the primary computing device (e.g., performing electronic banking transactions).

In some examples, a third-party watching the user enter their PIN on the primary input device 104 would see the user entering both true and false digits, but would not know which of the digits are true and which are false. Thus, if the third-party watches, or is otherwise able to determine the sequence of digits the user entered on the primary input device 104, the third-party would have witnessed a false PIN instead of the user's true PIN.

Referring now to FIG. 1B, the example system 100*b* includes a primary computing device 102 in communication with a primary input device 104 and a secondary input device 106, similar to system 100*a*. However, in system 100*b*, the secondary input device 106 is a secondary computing device, such as a user computing device. A user computing device can be any of a number of different types of computing devices including, for example, a mobile phone; smartphone; personal digital assistant; tablet computer, or wearable computing device (or, in other contexts, a laptop computer or desktop computer). A user computing device can have internal or external storage components for storing data and programs such as an operating system and one or more application programs. In particular, the internal or external storage components for user computing device can store an application for interfacing the primary computing device 102. Additionally or alternatively, a user computing device can be configured to interface with the primary computing device 102 without a specific client application, using, for example, through a web browser.

A user computing device can also include a central processing unit (CPU) for executing instructions stored in storage and/or received from one or more other electronic devices, for example over a network. A user computing device can also include one or more communication devices for sending and receiving data, for example, antennas, transceivers, communications cards, and other network adapters capable of transmitting and receiving data over a network (e.g., WiFi, Ethernet) through a wired or wireless data pathway, a short-range network (e.g., a personal area network such as a Bluetooth network), or by near field communication (NFC).

In some implementations, and with continued reference to FIG. 1B, the primary computing device 102 establishes communication with the secondary input device 106, and sends a mapping between a first set of input controls (e.g., keys on a keypad, icons on a touchscreen) on the primary input device 104 and a representation of a second set of input controls to the secondary input device 106. The secondary input device 106 displays the representation of the second set of input controls to a user. The primary computing device 102 receives a user's PIN from the primary input device 104, but according to the represented second set of input controls displayed on the secondary input device 106 not according to digits printed on the primary input device 104. Using the mapping, the primary computing device 102 can determine the user's true PIN. The primary computing device 104 can then use the true PIN to authenticate the user, and enable further interactions between the user and the primary computing device (e.g., performing electronic banking transactions).

A third-party watching the user enter their PIN on the primary input device 104 would see the user pressing keys on the primary input device 104 according to digits displayed on the primary input device 104, but be unaware of the second set on input controls and associated mapping with the controls on the primary input device 104. Thus, if the third-party watches, or otherwise is able to determine the sequence of digits the user entered on the primary input device 104, the third-party would have witnessed a false PIN instead of the user's true PIN.

Figure 2A:
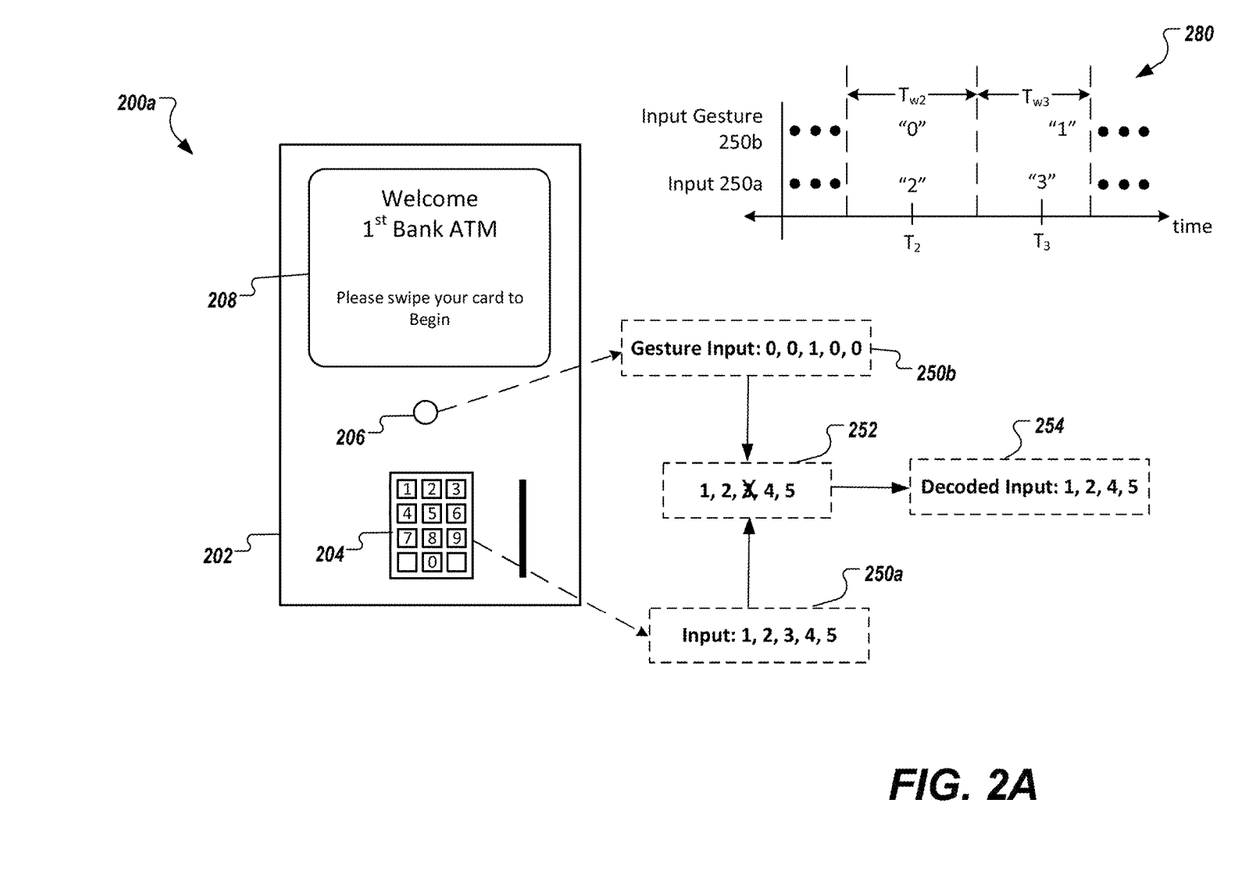
FIGS. 2A-2D depict example PIN security process flows within an example systems in accordance with implementations of the present disclosure.

FIGS. 2A-2D depict example PIN security process flows within example systems in accordance with implementations of the present disclosure. Referring to FIG. 2A, system 200*a* includes a primary computing device (e.g., an ATM) 202 having a primary input device (e.g., a keypad) 204, a secondary input device (e.g., a camera) 206, and an output device (e.g., a display) 208. In some implementations, the ATM 202 concurrently receives a first input 250*a* from the keypad 204, and a second input 250*b* from the camera 206. The first input 250*a* can be a PIN including one or more false digits (e.g., "1, 2, 3, 4, 5," where the digit "3" is false). The second input 250*b* can be one or more gestures performed concurrently with entry of the false digits. For simplicity, the second input 250*b* gestures are represented by binary digits "1" and "0" indicating the presence or absence, respectively, of a gesture during time periods corresponding to the entry of associated PIN digits, for example. Gesture inputs can include, but are not limited to: visual gestures such as facial gestures (e.g., a wink, blink, eyebrow motion, smile, etc.) and body gestures (e.g., a shoulder shrug, hand wave, head nod, etc.); audible gestures (e.g., a cough, clap, finger snap, etc.); tactile gestures (e.g., a push, swipe, stomp, duration of a touch input, etc.) on a touchpad or other sensor; or any combination of gestures.

The ATM 202 uses the gesture input to identify false digits in the first input 250*a* and determine the user's true PIN. For example, the gesture input (second input 250*b*) can be used as a mask for the first input 250*a* to identify and eliminate false digits (252). As shown in block 252, the false digit, "3," is identified in the first input 250*a* and removed in block 254 to decode the user's true PIN. The ATM 202 can use the true PIN to authenticate the user, and enable further interactions between the user and the ATM 202 (e.g., performing electronic banking transactions). A third-party watching the user enter their PIN on the ATM keypad 204 would observe the user enter "1, 2, 3, 4, 5," thus the third-party did not observe the user's true PIN. Even if the third-party knew that the user's PIN was only four digits long, the third-party would not know which of the additional digits are true and which are false. Moreover, a user may further obfuscate their PIN by entering additional false digits along with corresponding gestures. For example, the user may enter "1, 2, 3, 4, 5, 6, 7, 8," and perform gestures while entering "3," "4," "6," and "8" to indicate that those are false digits. The ATM 202 would then determine the user's true PIN to be "1, 2, 5, 7." Furthermore, the user need not perform the same gesture for each false digit. For instance, in some implementations, the ATM 202 can detect multiple types of gestures any of which can indicate a false digit.

In some implementations, gesture inputs (second input 250*b*) can be correlated with respective key inputs (first input 250*a*) based on timing synchronization between the first and second inputs. For example, the second input 250*b* can be a time-based input such as a, for example, a streaming input (e.g., video or audio) or a time sampled sensor input (e.g., from a touch screen or pressure sensor). The ATM 202 can detect gestures contained within the second input 250*b* by searching during predefined or adaptive time windows corresponding to the timing of each entry of the first input 250*a*. The graph 280 illustrates and example gesture detection process. The graph 280 depicts an exemplary timing for receiving the second and third digits of the PIN input (first input 250a), namely, "2" and "3" at times $T_2$ and $T_3$, respectively. The ATM 202 can search a video stream captured by camera 206 for a gesture corresponding with the PIN digit "2" during time window $T_{w2}$, and for a gesture corresponding with the PIN digit "3" during time window $T_{w3}$. The ATM 202 can, therefore, associate a gesture detected during any portion of a time window with the corresponding PIN digit, and identify a corresponding digit as a false digit. In some implementations, the duration of each time window can be determined dynamically, for example, based on the speed at which a user enters PIN digits into keypad 204.

In some implementations, a gesture can indicate that an associated user input should be incremented or decremented. For example, if a user enters the keypad input "1, 2, 3, 4" and performs a gesture (e.g., a wink) that corresponds to their entry of the digit "4," the gesture can indicate that the digit "4" should be incremented by one. Therefore, the user's true PIN would be "1, 2, 3, 4+1" or "1, 2, 3, 5." In some examples, different types of gestures or performing multiple gestures corresponding to a digit entry can indicate that the associated digit should be incremented further. For example, if the user perfumed a different gesture (e.g., a shoulder shrug) or multiple gestures (e.g., two winks) while entering the digit "4," that can indicate that the users true PIN is "1, 2, 3, 4+2" or "1, 2, 3, 6."

Figure 2B:
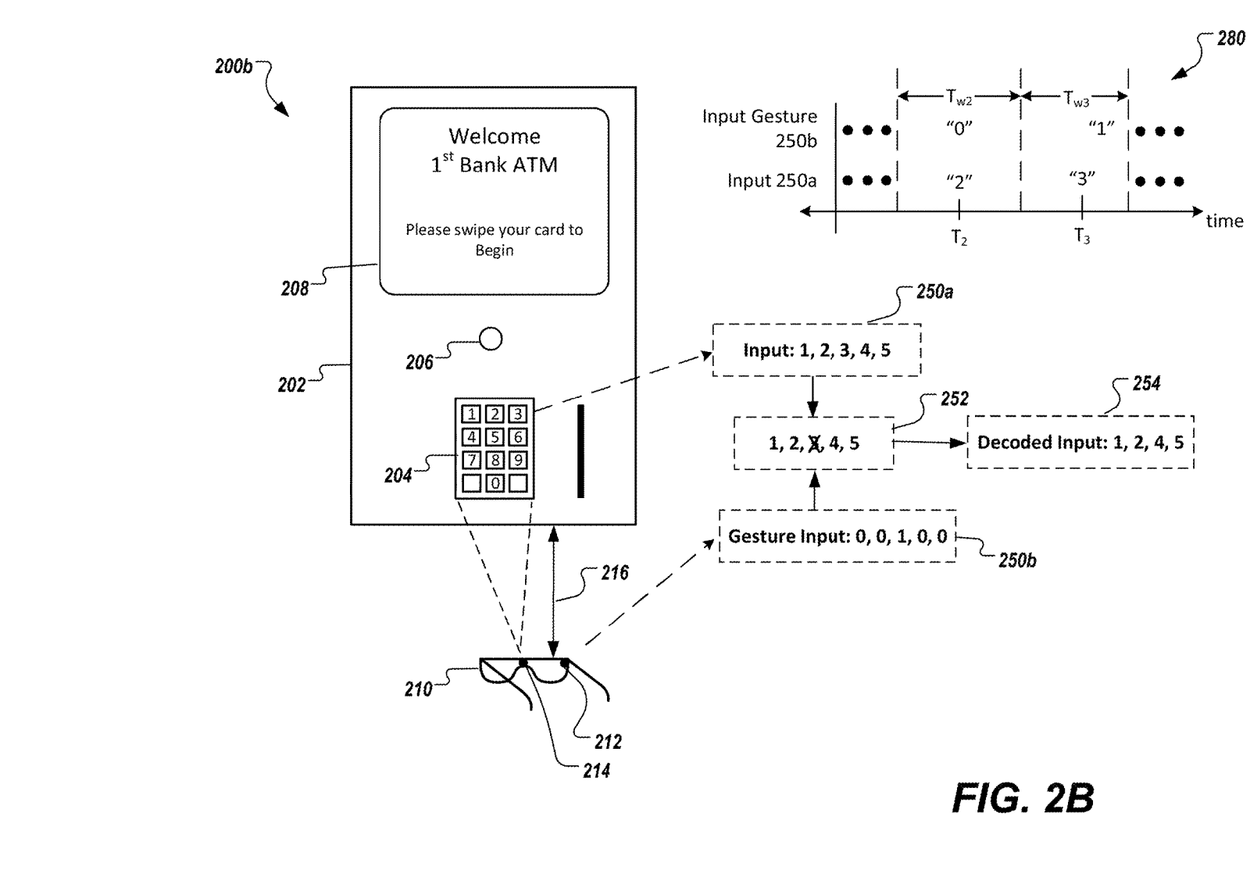

Referring to FIG. 2B, system 200b is similar to system 200a, and includes a primary computing device (e.g., an ATM) 202 having primary input device (e.g., a keypad) 204, and an output device (e.g., a display) 208. In addition, system 200b includes a secondary computing device 210 (e.g., a wearable computing device or mobile computing device) in communication with the ATM 202 as a secondary input device. The computing device 210 can include an internal facing sensor 212 sensor 212 (e.g., a camera or infrared detector sensing the user's gestures) and an external facing sensor 214 (e.g., a camera capturing images in a direction facing away from the user). The computing device 210 can communicate 116 with the ATM over a network (e.g., Bluetooth, WiFi) through a wireless data pathway, or by NFC, for example.

In some implementations, gestures can be detected by sensors other than or in addition to a camera on a computing device 210 such as, for example, an accelerometer or other motion sensor. For example, the computing device can be a smart watch and can detect a gesture such as a wave or fist pump that corresponds to the user's entry of a PIN digit.

In some implementations, and with continued reference to FIG. 2B, the ATM 202 and computing device 210 establish electronic communications 216. The ATM 202 receives a first input 250a from the keypad 204, and a second input 250b from the computing device 210. The first input 250a can be a PIN including one or more false digits (e.g., "1, 2, 3, 4, 5," where the digit "3" is false). The second input 250b can be one or more gestures performed concurrently with the entry of the false digits. For simplicity, the second input 250b gestures are represented by binary digits "1" and "0" indicating the presence or absence, respectively, of a gesture during time periods corresponding to the entry of associated PIN digits, for example. As with system 200a, gesture inputs are used to identify false digits in the first input 250a and determine the user's true PIN for authenticating the user.

The internal facing sensor 212 on computing device 210 captures the user's gesture inputs 250b and transmits the gesture inputs to the ATM 202. As described above, the ATM 202 can use the gesture inputs 250b to determine the user's true PIN from the first input 250a (252, 254), authenticate the user based on the true PIN, and enable further interactions between the user and the ATM 202 (e.g., performing electronic banking transactions).

In some implementations, the ATM 202 and the computing device 210 can establish a synchronized timing for recording the first and second inputs. The computing device 210 can detect the user's gestures and associate each gesture with a time, and transmit gesture data including the time that each gesture was performed to the ATM 202 as gesture input 250b. The gesture input data can be, for example, binary data indicating the presence or absence of a detected gesture and an associated time. The gesture input also can include additional data such as, for example, a type of gesture performed along with an associated time. The ATM 202 can correlate the gesture input 250b and associated timing data with the key inputs (first input 250a) to determine the user's true PIN. For example, as indicated in graph 280, the third gesture input ("1") and synchronized timing data may indicate that a gesture was performed during the time window $T_{w3}$ corresponding with the user's entry of the third PIN digit ("3"). The ATM 202 can then determine that the digit "3" is a false digit and remove the "3" from the PIN to establish the user's true PIN.

In some implementations, the computing device 210 can monitor the user's interaction with the keypad 204 of the ATM 202, for example, using the external facing sensor 214. Such an implementation, may not require timing synchronization between the computing device 210 and the ATM 202. For example, by monitoring the user's interaction with the keypad 204 (e.g., when the user presses buttons on the key pad) the computing device 210 can detect when the user enters PIN digits on the keypad 204, while concurrently monitoring the user's gestures with the internal facing sensor 212. The computing device 210 can correlate the timing between PIN digit entries (first input 250a) on the keypad 204 and gesture inputs (250b), and generate PIN mask data to be transmitted to the ATM 202 for determine the user's true PIN. For example, PIN mask data can be a sequence of data indicating the presence or absence of a gesture absent timing data such as a sequence of binary data. In other words, the computing device 210 may perform the process illustrated in graph 280 of correlating the timing of gestures with the entry of particular digits of the first input 250a, although the computing device 210 may not recognize the value of each digit entered. The computing device 210 then sends the ATM 202 a series of data representing the gesture inputs (e.g., a data vector equal in length to the PIN values received by the ATM 202 from the keypad 204) for comparison with the first input 250a received by the ATM 202.

In some implementations, the computing device 210 can recognize the PIN values entered by a user on the ATM keypad 204. For example, the computing device 210 may perform character recognition on video frames received from the external facing sensor 214 to identify a location of each key on the keypad 204 and generate a position mapping of the numbers represented on the keypad 204. Instead of monitoring only for motion related to a user pressing a key, the computing device 210 can determine the position of the user's finger with respect to the location of individual keys (e.g. the "1" key). In such an implementation, the computing device 210 can perform the steps of identifying and eliminating false digits (252) and determining the user's true PIN (254). The computing device 210 can then send the user's true PIN to the ATM 202. In some implementations, the computing device 210 may send both the user's true PIN (as determined by the computing device) and the gesture data (250*b*) to the ATM 202. In such implementations, the true PIN determined by the computing device 210 may serve as a verification of the true PIN determined by the ATM 202. In the event that the true PINs do not match, the ATM 202 may request that the user re-enter the PIN. In some implementations, the computing device 210 can determine whether to send the true PIN or the gesture data to the ATM 202 based on security level associated with the communication channel between the ATM 202 and the computing device 210. For example, if a security level is below a threshold value, the computing device 210 may transmit only the gesture input data 250*b*.

In some implementations, the can have a machine readable code (e.g., a quick recognition (QR) code or barcode) displayed on or near the ATM, which encodes instructions readable by the computing device 210 for establishing communications with the ATM 202. For example, the machine readable code can direct the computing device 210 to a website for downloading an application or applet to establish communications with the ATM 202. In some examples, the machine readable code can include a uniform resource identifier (URL) of the ATM 202 for establishing communications with the ATM 202 over the internet.

In some implementations of systems 200*a* and 200*b*, the gesture inputs can indicate true digits instead of false digits. For example, a user may enter 1, 2, 3, 4, 5 at the keypad 204 and perform gestures while entering the digits "1," "2," "4," and "5" to indicate that these are true digits of the user's PIN.

Figure 2C:
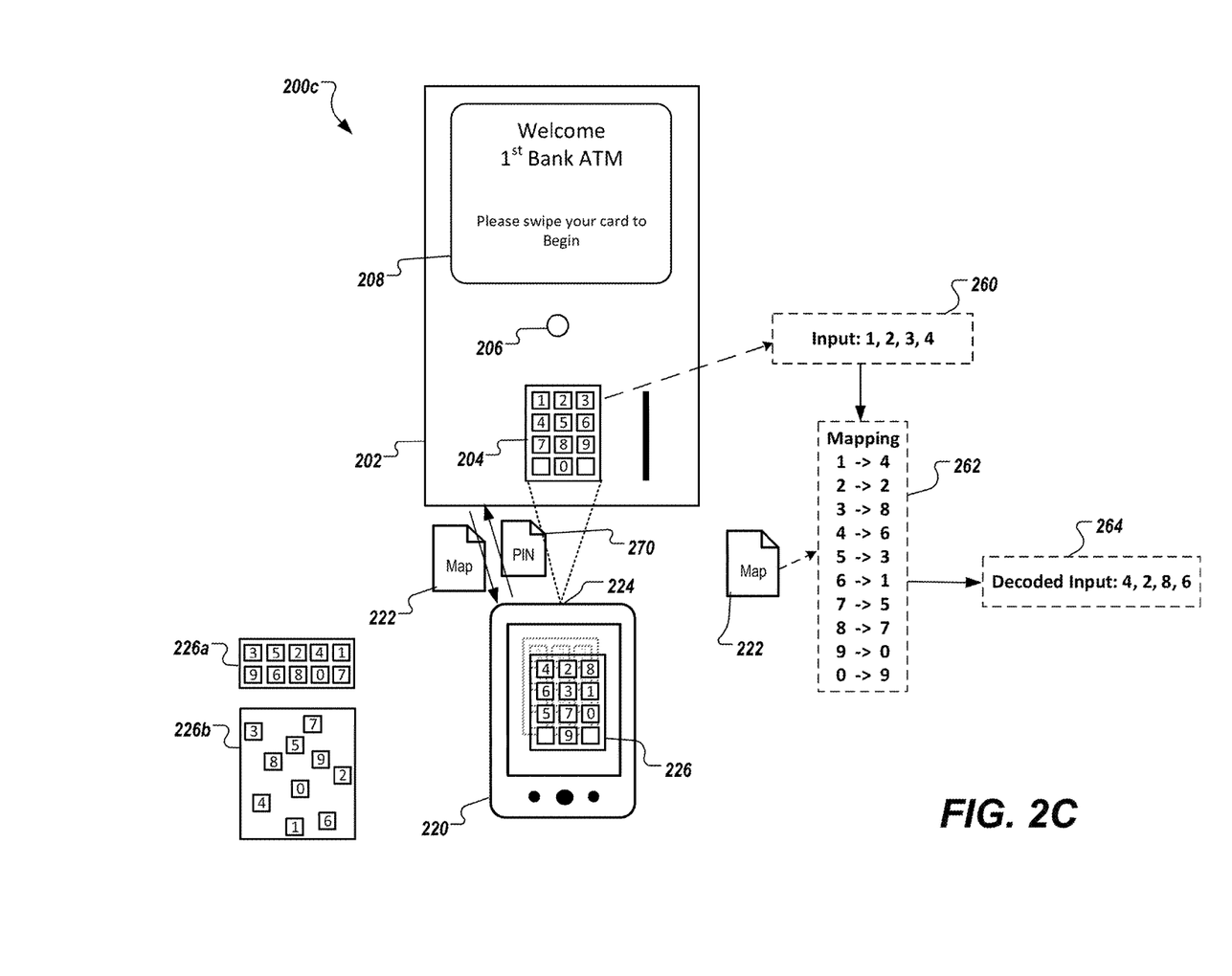

Referring to FIG. 2C, system 200*c* includes a primary computing device (e.g., an ATM) 202 having primary input device (e.g., a keypad) 204, and an output device (e.g., a display) 208. In addition, system 200*c* includes a secondary computing device 220 (e.g., a wearable computing device or mobile computing device) in communication with the ATM 202. The computing device 220 can communicate with the ATM 202 over a network (e.g., Bluetooth, WiFi) through a wireless data pathway, or by NFC, for example.

The computing device 220 establishes electronic communications with the ATM 202. For example, a machine readable code (e.g., a QR code or barcode) can be displayed on or near the ATM (e.g., physically printed on the ATM 202 or presented on the ATM's display 208), which encodes instructions readable by the computing device 210 for establishing communications with the ATM 202. For example, the machine readable code can direct the computing device 210 to a website for downloading an application or applet to establish communications with the ATM 202. In some examples, the machine readable code can include a URL of the ATM 202 for establishing communications with the ATM 202 over the internet. In some examples, an application on the computing device 220 or ATM 202 can detect when the computing device 220 is nearby and cause the computing device 220 and ATM 202 to establish electronic communications, for example, through a Bluetooth or NFC communications channel. For example, activating a mobile version of the banking application on the computing device 220 can trigger discovery of the ATM 202 by the computing device 220 or discovery of the computing device 220 by the ATM 202. In some examples, a global positioning system (GPS) on the computing device 220 can be used to determine when the user is in proximity to the ATM 202. In some examples, the computing device 220 can use a cellular network to establish electronic communications with the ATM 202.

In some examples, the ATM 202 sends an input map 222 to the computing device 220. For example, the input map 222 can map input between a first set of input controls (e.g., keys on a keypad, icons on a touch screen) displayed on the keypad 204 of the ATM 202 and a representation of a second set of input controls 226 (e.g., input icons). In some examples (as shown in FIG. 2C), the input controls in the second set of input controls 226 are arranged differently than the keys of the keypad 204. As shown, for example, the character associated with the upper right input control is "8" while the character associated with the upper right keypad 204 key is "3." In some examples, the computing device 220 can capture an image of the keypad 204 using, for example, an external facing camera 224 of the computing device 220, and the input map 222 can be displayed to a user as an augmented reality representation of the second set of input controls 226 over the image of the actual keypad 204, thereby, providing a user with a relative special orientation between the second set of input controls 226 and the keypad 204.

The user can enter their PIN on the keypad 204 of the ATM 202 guided by the representation of the second set of input controls 226. For example, a user of the computing device 220 can view the second set of input controls 226 on the computing device 220. If the user's true PIN is 4, 2, 8, 6, instead of pressing the digits "4," "2," "8," and "6" on the keypad 204, based on the displayed second set of input controls 226, the user would enter the digits "1," "2," "3," and "4" on the keypad 204. Thus, a third-party watching the user enter their PIN on the keypad 204, but unaware of the second set of input controls 226 and the map 222 relating the second set of input controls 226 to the keypad 204, would observe the user entering the digits "1," "2," "3," and "4." Consequently, the third-party would witness a false PIN instead of the user's true PIN.

The ATM 202 receives the user's input 260 from the keypad 204, and uses a mapping 262 (e.g., from map 222) of the keypad digits to the second set of input controls 226 to determine the user's true PIN 264. In the example described above, the user's entry of the digits "1," "2," "3," and "4" on the keypad 204 would map to the user's true PIN 264 (e.g., 4, 2, 8, 6). The ATM 202 can use the user's true PIN to authenticate the user, and enable further interactions between the user and the ATM 202 (e.g., performing electronic banking transactions).

In some implementations, the electronic communications between the ATM 202 and the computing device 220 can include only a one-way communication from the ATM 202 to the computing device 220. In some examples, only a single electronic communication is required between the ATM 202 and the computing device 220; the transfer of the input map 222 from the ATM 202 to the computing device 220, for example, through NFC. In another example, when a user swipes their debit card at the ATM 202, the ATM 202 can generate an input map 222 and encode the input map 222 within a machine readable code (e.g., a QR code) displayed on the ATM display 208. The user can scan the machine readable code with the computing device 220 and a banking application on the computing device 220 can decode the input map 222 and present a representation of the second set of input controls 226 to the user.

In some implementations, the electronic communications between the ATM 202 and the computing device 220 can include two-way communications between the ATM 202 to the computing device 220. For example, a user can be permitted or prompted to enter their true PIN on the second set of input controls 226 displayed on the computing device 220 (e.g., using selectable icons on a touch screen), instead of using the actual keypad 204 on the ATM 202. The computing device 220 can transmit the user's true PIN 270 to the ATM 202. In some examples, because an arrangement of the second set of input controls 226 displayed on the computing device 220 is different from an arrangement of keys on the keypad 204, even if a third-party observed the user entering the PIN on the computing device, or even attempted to obtain smudges or fingerprints from the user's computing device to determine the user's PIN, the third-party would not know what digit values the user entered. The third-party could only observe or determine from keypad smudges a spatial pattern of button presses, and not the digit values. Such an implementation may be advantageous, for example, in private security systems and other systems in which a common code number is routinely entered.

In some implementations in which the user enters a PIN on the computing device 220, the spatial arrangement of the second set of input controls 226 need not mimic the arrangement of input controls or design of the keypad 204 itself. For example, the second set of input controls 226 could randomize not only the values represented by each input control as compared to the keypad 204, but also the location of each input control displayed on the computing device 220. For example, the input controls in the second set of input controls 226 can be displayed as an out of sequence number line 226a, a random distribution of icons 226b, or other appropriate representations.

In some implementations, the computing device 220 can generate the input map 222, for example, by performing character recognition on an image of the keypad 204 obtained using the external facing camera 224, and generating the second set of input controls 226 for display to the user. The computing device 220 also can generate the map 222 relating the first set of input controls on the keypad 204 to the second set of input controls 226, and transmit the mapping 262 to the ATM 202.

Figure 2D:
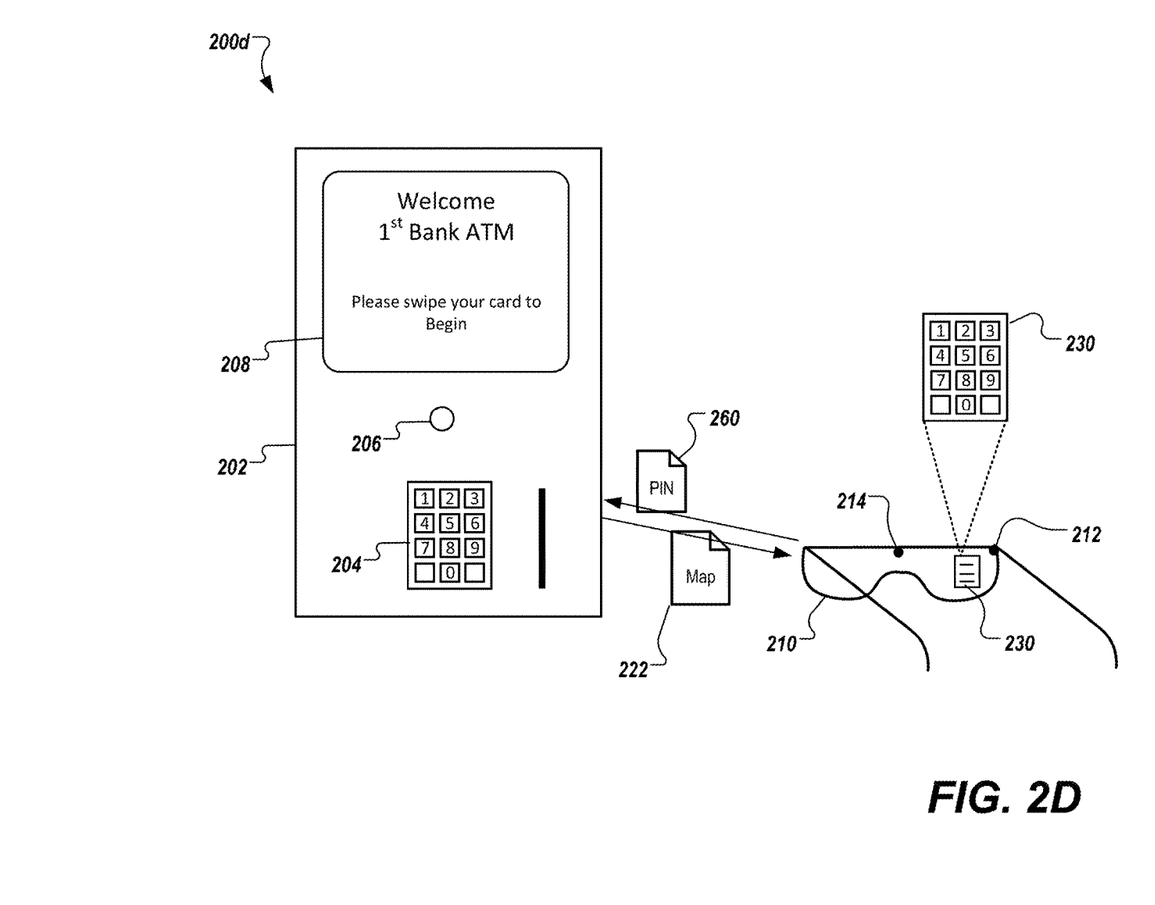

Referring to FIG. 2D, system 200d is a variation of system 200c, and includes a primary computing device (e.g., an ATM) 202 having primary input device (e.g., a keypad) 204, and an output device (e.g., a display) 208. In addition, system 200d includes a secondary computing device 210 (e.g., a wearable computing device or mobile computing device) in communication with the ATM 202. The computing device 210 can include an internal facing sensor 212 (e.g., a camera or infrared detector sensing the user's gestures) and an external facing sensor 214 (e.g., capturing images in a direction facing away from the user). The computing device 210 can communicate with the ATM over a network (e.g., Bluetooth, WiFi) through a wireless data pathway, or by NFC, for example.

As described above in reference to system 200d, the computing device 210 establishes electronic communications with the ATM 202. The ATM 202 sends an input map 222 to the computing device 220. For example, the input map 222 can map input between a first set of input controls (e.g., keys on a keypad, icons on a touch screen) displayed on the keypad 204 of the ATM 202 and a representation of a second set of input controls 230. In some examples, the second set of input controls 230 can be arranged differently from the input controls displayed on the keypad 204, or the second set of input controls 230 can be arranged similarly to those displayed on the keypad 204. The second set of input controls 230 is displayed to the user by the computing device 210. In some examples, the process for entering the user's PIN is similar to that described above in reference to system 200c. That is, the user enters their true PIN into the ATM keypad 204 based on the second set of input controls 230 displayed on the computing device 210, and the ATM 202 uses a mapping (e.g., input map 222) between the keypad 204 keys and second set of input controls 230 to determine the user's true PIN.

In some implementations, an arrangement of the second set of input controls 230 can be similar to the arrangement of keys displayed on the keypad 204, and the user can be permitted or prompted to enter their true PIN using the computing device 210 (e.g., with gestures), instead of using the actual keypad 204 on the ATM 202. The computing device 210 can transmit the users true PIN 270 to the ATM 202. In some examples, the computing device 210 can track the user's eye movement and position to determine which input control in the second set of input controls 230 the user is looking at, and can detect a user selection of each input control by way of a user gesture (e.g., blinking or tapping on the computing device). The user can enter their true PIN by a series of gestures detectable by the computing device 210. Because the second set of input controls 230 displayed on the computing device 210 is not visible to the third-party, and the user enters their PIN using gestures, the third-party would not be able to observe or decipher the user's true PIN. In some implementations, a camera 206 on the ATM, for example, in conjunction with an infrared sensor to monitor the users eye movements, can monitor series of eye gestures that make up the user's PIN.

In some implementations, the computing device 210 can generate the second set of input controls 230 instead of receiving an input map 222 from the ATM 202. For example, the computing device 210 can perform character recognition on an image of the keypad 204 obtained using the external facing sensor 214 (e.g., camera) to generate the second set of input controls 230.

In some implementations, the computing device 210 provides the user with feedback to confirm the user's selection of each key. For example, the computing device 210 can provide a visual feedback, such as briefly highlighting a selected key, or audio feedback, such as announcing the value of a selected key through a speaker on the computing device 210.

In some implementations, the user can have a gesture based PIN. For example, instead of entering alphanumerical characters, the user's PIN can be a series of gestures detectable by the computing device 210 (e.g., eye gestures, eyebrow gestures, facial gestures, blinks or winks, or any combination of gesture types and selection of alphanumeric characters). For example, the user's PIN could include a series of eye gestures, such as looking up, up, down, down, left, right, left, and right. The computing device 210 can verify the user's PIN, for example, through a banking application, and transmit data confirming the user's authentication to the ATM 202. In some implementations, a camera 206 on the ATM can monitor series of gestures that make up the user's PIN.

Figure 3:
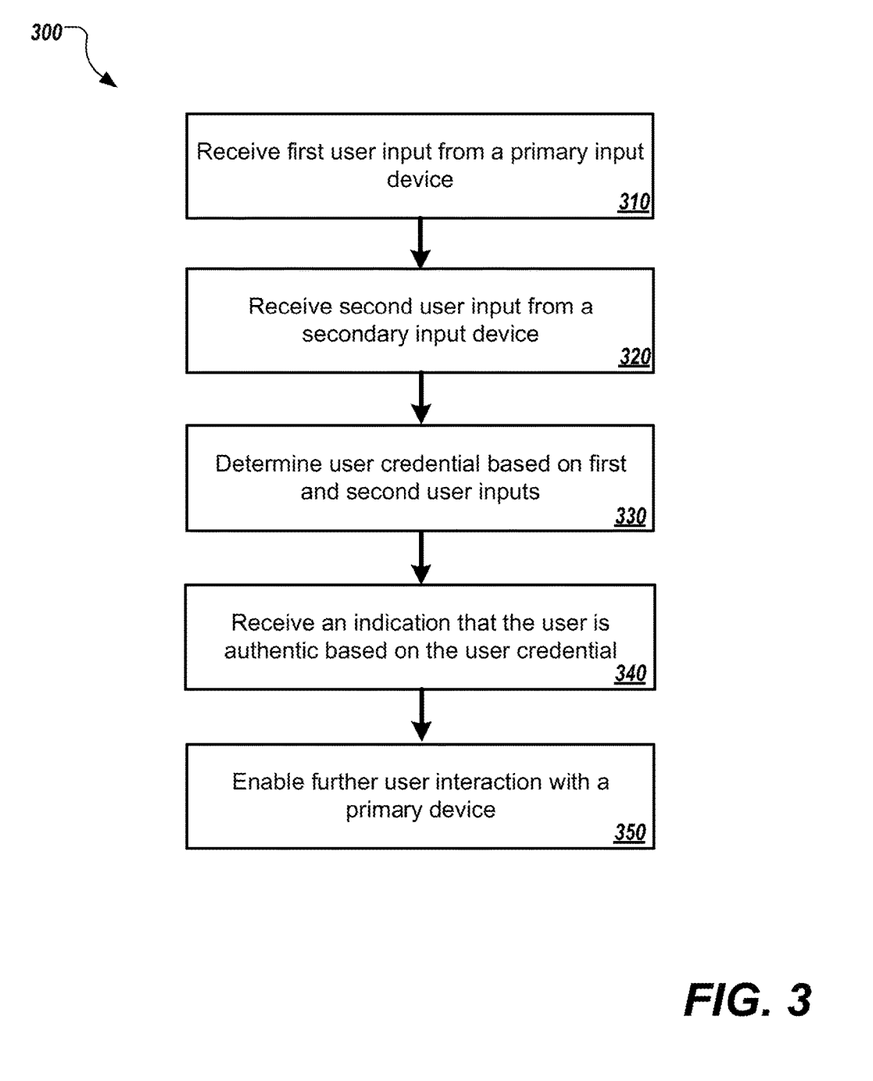
FIGS. 3 and 4 depict example processes that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some examples, the process 300 is executed a computing system (e.g., systems or components of systems 100a, 100b, 200a, 200b) to authenticate a user. In some examples, the process 300 can be executed by a primary computing device such as, for example, an ATM, a mobile device (e.g., a smartphone, tablet computer), a point-of-sale device (e.g., a credit/debit card reader), a television, a cable box, an internet TV device, a vehicle entry system, or a gate or building entry system.

A first user input is received from a primary input device (310). For example, the first user input can be provided by a user to a primary input device that is coupled to a primary device. A second user input is received from a secondary input device (320). For example, the second user input can be provided by the user to the secondary input device that is in communication with the primary device. For example, the secondary input device can be a camera, microphone, touchpad, or touchscreen. In some examples, the secondary input device can be a mobile phone; smartphone; personal digital assistant; tablet computer, wearable computing device, a laptop computer, or desktop computer.

A user credential is determined based on the first user input and the second user input (330). For example, at least one or the first input and the second input includes at least a portion of the user credential, and the user's complete or correct credential can be determined based on the first and second user inputs.

An indication is received that the user is authentic based on the user credential (340), and in response, the user is enabled to further interact with the primary device (350). For example, the primary device can evaluate the user credential to determine that the user is authentic. In some examples, the primary device can send the user credential to another computing device (e.g., a server) to determine whether the user is authentic.

Figure 4:
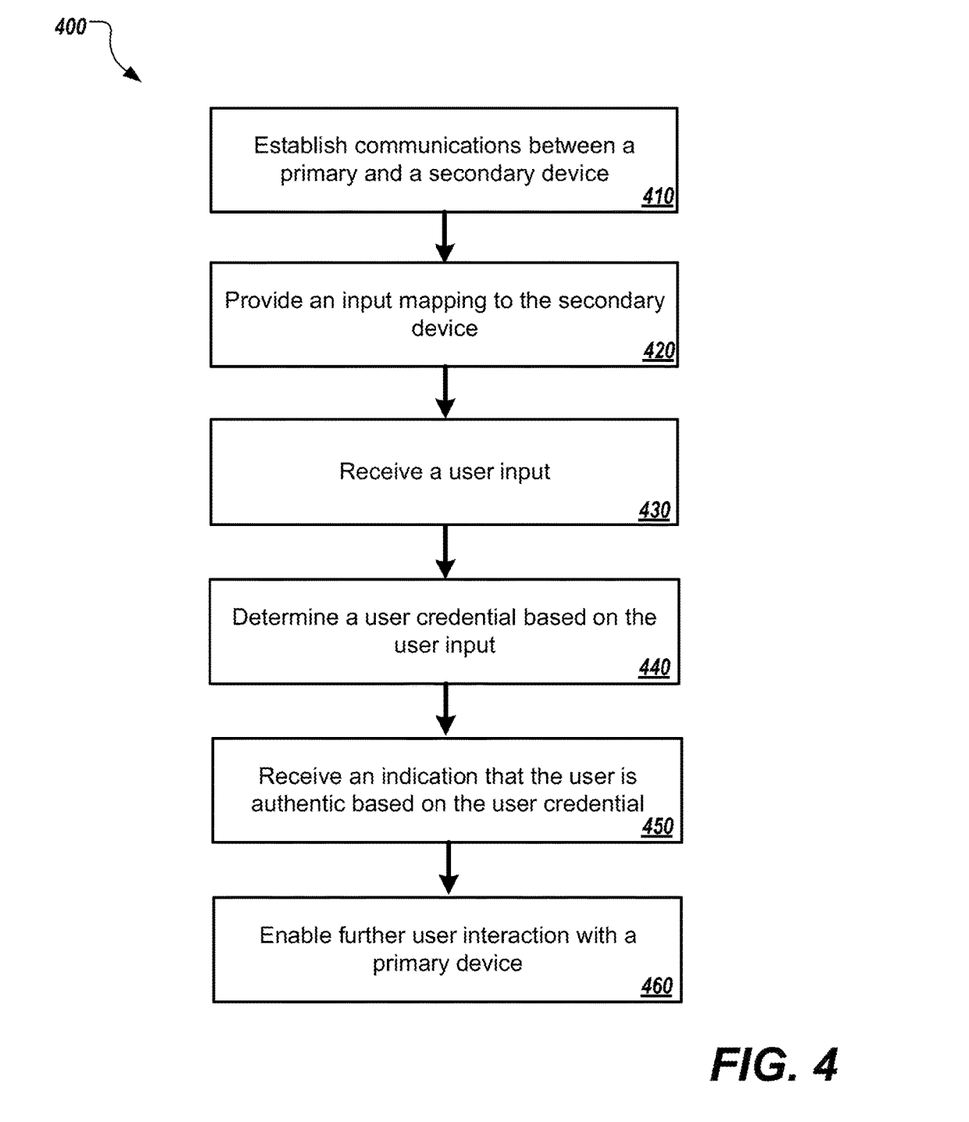

FIG. 4 depicts an example process 400 that can be executed in accordance with implementations of the present disclosure. In some examples, the example process 400 can be provided as one or more computer-executable programs executed using one or more computing devices. In some examples, the process 400 is executed a computing system (e.g., systems or components of systems 100b, 200c, 200d) to authenticate a user. In some examples, the process 400 can be executed by a primary computing device such as, for example, an ATM, a mobile device (e.g., a smartphone, tablet computer), a point-of-sale device (e.g., a credit/debit card reader), a television, a cable box, an internet TV device, a vehicle entry system, or a gate or building entry system.

Communications are established between a primary device and a secondary device (410). An input mapping is provided to the secondary device (420). For example, the input mapping can associate a first set of input controls (e.g., keys) on an input device with a representation of a second set of input controls displayed to the user.

A user input is received (430). For example, the user input can be provided by the user to the primary device or the secondary device based on the input mapping. For example, the user can enter an input according to a representation of a second set of input controls. A user credential is determined based on the first user input (440). For example, the first user input can be mapped to a true user input based on the mapping.

An indication is received that the user is authentic based on the user credential (450), and in response, the user is enabled to further interact with the primary device (460). For example, the primary device can evaluate the user credential to determine that the user is authentic. In some examples, the primary device can send the user credential to another computing device (e.g., a server) to determine whether the user is authentic.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what can be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:
1. A system, comprising:
a primary device; and
a computer-readable storage device coupled to the primary device and having instructions stored thereon which, when executed by the primary device, cause the primary device to perform operations for authenticating user credentials, the operations comprising:
receiving, from a primary input device that is coupled to the primary device, first user input provided by a user to the primary input device, the first user input comprising a plurality of characters including one or more true characters and at least one false character;
receiving, from a secondary input device that is in communication with the primary device, second user input provided by the user to the secondary input device, wherein the second user input indicates the at least one false character;

determining a user credential based on the first user input and the second user input, at least one or the first input and the second input comprising at least a portion of the user credential; and receiving an indication that the user is authentic based on the user credential, and in response, enabling the user to further interact with the primary device.

2. The system of claim 1, wherein the secondary input device is a component of the primary device.

3. The system of claim 1, wherein the secondary input device is a computing device of the user and is in communication with the primary device.

4. The system of claim 1, wherein the primary input device is a keypad of the primary device, and the first user input is provided based on user input to the keypad of the primary device.

5. The system of claim 1, wherein the second user input is provided based on visual gestures of the user, the visual gestures being detected by the secondary input device.

6. The system of claim 1, wherein the second user input is provided based on audible gestures of the user, the audible gestures being detected by the secondary input device.

7. The system of claim 1, wherein the second user input is provided based on tactile gestures of the user, the tactile gestures being detected by the secondary input device.

8. The system of claim 1, wherein the primary device and the secondary input device are in communication through a short-range network or near field communications (NFC).

9. The system of claim 1, wherein the second user input indicates a change to the first user input that is required to determine the user credential.

10. A computer implemented method executed by one or more processor of a primary device, the method comprising:

receiving, from a primary input device that is coupled to the primary device, first user input provided by a user to the primary input device, and the first user input comprising a plurality of characters including one or more true characters and at least one false character;

receiving, from a secondary input device that is in communication with the primary device, second user input provided by the user to the secondary input device, wherein the second user input indicates the at least one false character;

determining a user credential based on the first user input and the second user input, at least one or the first input and the second input comprising at least a portion of the user credential; and receiving an indication that the user is authentic based on the user credential, and in response, enabling the user to further interact with the primary device.

11. The method of claim 10, wherein the second user input is provided based on visual gestures of the user, audible gestures of the user, or tactile gestures of the user, and wherein the visual gestures, audible gestures, or tactile gestures are detected by the secondary input device.

12. The method of claim 10, wherein the primary device and the secondary input device are in communication through a short-range network or near field communications (NFC).

13. A system, comprising:

a primary device; and a computer-readable storage device coupled to the primary device and having instructions stored thereon which, when executed by the primary device, cause the primary device to perform operations for authenticating user credentials, the operations comprising:

establishing communication with a secondary device;

providing, to the secondary device, an input map that associates potential user inputs, wherein the input map associates false user input to actual user input;

receiving first user input provided by the user to at least one of the primary device and the secondary device based on the input map;

determining a user credential based on the first user input; and receiving an indication that the user is authentic based on the user credential, and in response, enabling the user to further interact with the primary device.

14. The system of claim 13, wherein the first user input is provided to the primary device.

15. The system of claim 13, wherein the first user input is provided to the secondary device.

16. The system of claim 13, wherein the first user input is provided based on visual gestures of the user, the visual gestures being detected by the secondary device.

17. The system of claim 13, wherein the first user input is provided based on tactile gestures of the user, the tactile gestures being detected by the secondary device.

18. The system of claim 13, wherein establishing communication with a secondary device comprises establishing communications between the primary device and the secondary device through a short-range network or near field communications (NFC).

19. The system of claim 13, wherein the input map relates a first set of input controls of an input device to a representation of a second set of input controls displayed on the secondary device.

20. The system of claim 13, wherein the input map includes a scrambled representation of inputs on an input device coupled to the primary device.

* * * * *